United States Patent
Fright et al.

[11] Patent Number: 5,969,822
[45] Date of Patent: Oct. 19, 1999

[54] ARBITRARY-GEOMETRY LASER SURFACE SCANNER

[75] Inventors: William R Fright; Bruce C McCallum, both of Christchurch; Mark A Nixon, Wellington; Nigel B Price, Christchurch, all of New Zealand

[73] Assignee: Applied Research Associates NZ Ltd., Christchurch, New Zealand

[21] Appl. No.: 08/809,784

[22] PCT Filed: Sep. 28, 1995

[86] PCT No.: PCT/NZ95/00097

§ 371 Date: Jul. 15, 1997

§ 102(e) Date: Jul. 15, 1997

[87] PCT Pub. No.: WO96/10205

PCT Pub. Date: Apr. 4, 1996

[30] Foreign Application Priority Data

Sep. 28, 1994 [NZ] New Zealand .............................. 264564

[51] Int. Cl.⁶ .................................................... G01B 11/24
[52] U.S. Cl. ............................................................ 356/376
[58] Field of Search ...................................... 356/375, 376

[56] References Cited

U.S. PATENT DOCUMENTS

| | | |
|---|---|---|
| Re. 35,816 | 6/1998 | Schulz . |
| 3,821,469 | 6/1974 | Whetstone et al. . |
| 3,983,474 | 9/1976 | Kuipers . |
| 4,017,858 | 4/1977 | Kuipers . |
| 4,209,254 | 6/1980 | Reymond et al. . |
| 4,402,608 | 9/1983 | DiMatteo et al. . |
| 4,585,350 | 4/1986 | Pryor . |
| 4,649,504 | 3/1987 | Krouglicof et al. . |
| 4,660,970 | 4/1987 | Ferrano . |
| 4,701,047 | 10/1987 | Eibert et al. . |
| 4,701,049 | 10/1987 | Beckmann et al. . |
| 4,705,395 | 11/1987 | Hageniers . |
| 4,705,401 | 11/1987 | Addleman et al. . |
| 4,709,156 | 11/1987 | Murphy et al. . |
| 4,721,384 | 1/1988 | Dietrich et al. . |

(List continued on next page.)

FOREIGN PATENT DOCUMENTS

| | | |
|---|---|---|
| 0 244 274 | 11/1987 | European Pat. Off. . |
| 0 322 314 | 6/1989 | European Pat. Off. . |
| 0 452 422 | 9/1993 | European Pat. Off. . |
| 0 581 434 A1 | 2/1994 | European Pat. Off. . |
| 2 275 339 | 8/1994 | United Kingdom . |
| Letter | 10/1998 | United Kingdom . |
| WO 87/01194 | 2/1987 | WIPO . |
| WO 92/07233 | 4/1992 | WIPO . |

OTHER PUBLICATIONS

Burton R. et al.,"Twinkle Box—A three–dimensional computer input device", *AFIPS Conference Proceedings*, 43:513–520 (1974).

(List continued on next page.)

*Primary Examiner*—Robert H. Kim
*Assistant Examiner*—Amanda Merlino
*Attorney, Agent, or Firm*—Merchant & Gould P.C.

[57] ABSTRACT

An optical non-contact surface scanning method and system is described. The three-dimensional coordinates of an illuminated profile or spot on the object are recorded and the surface is reconstructed using spatial location and orientation information derived from a spatial location system associated with the object, illumination means, and image recording means. The illumination and imaging means may be hand-held in a combined unit or in separate units. The scanning system allows complete free and arbitrary movement of the object and all components of the scanning during scanning this allowing scanning of substantially all of the surface which may be visible at various locations and orientations around the object. The optical non-contact scanning system may find particular application in medical imaging of the human body or parts thereof. It may further find application in industrial processes whereby the passage of arbitrarily shaped objects are monitored through a production line or similar situations.

18 Claims, 3 Drawing Sheets

U.S. PATENT DOCUMENTS

| | | |
|---|---|---|
| 4,721,388 | 1/1988 | Takagi et al. . |
| 4,733,969 | 3/1988 | Case et al. . |
| 4,737,032 | 4/1988 | Addleman et al. . |
| 4,743,771 | 5/1988 | Sacks et al. . |
| 4,745,290 | 5/1988 | Frankel et al. . |
| 4,753,528 | 6/1988 | Hines et al. . |
| 4,761,072 | 8/1988 | Pryor . |
| 4,764,015 | 8/1988 | Bieringer et al. . |
| 4,764,016 | 8/1988 | Johansson . |
| 4,767,934 | 8/1988 | Stauffer . |
| 4,775,235 | 10/1988 | Hecker et al. . |
| 4,782,239 | 11/1988 | Hirose et al. . |
| 4,794,262 | 12/1988 | Sato et al. . |
| 4,803,645 | 2/1989 | Ohtomo et al. . |
| 4,821,200 | 4/1989 | Oberg . |
| 4,822,163 | 4/1989 | Schmidt . |
| 4,825,091 | 4/1989 | Breyer et al. . |
| 4,829,373 | 5/1989 | Leberl et al. . |
| 4,836,778 | 6/1989 | Baumrind et al. . |
| 4,982,188 | 1/1991 | Fodale et al. . |
| 5,198,877 | 3/1993 | Schulz ...................................... 356/376 |

OTHER PUBLICATIONS

Fischer, P. et al., "Stereometric Measurement System For Quantification of Object Forms", *SPIE Biosterometrics* 602:52–57 (1985).

Fuchs, H. et al., "Acquisition and Modeling of Human Body Form Data ", *SPIE*, 166:94–102 (1978).

Macellari, V,. "CoSTEL: a computer peripheral remote sensing device for 3–dimensional monitoring of human motion", *Medical & Biologica Engineering & Computing*, 21:311–318 (1983).

Mesqui, F. et al, "Real–Time, Noninvasive Recording and Three–dimensional Display of the Functional Movements of an Arbitrary Mandible Point", *SPIE*, 602:77–84 (1985).

Sakaguchi, Y. et al, "Acquisition of Entire Surface Data Based on Fusion of Range Data" *IEICE Transactions*, E74(10):3417–3422 (Oct. 1991).

Yamashita, Y, et al. "Three–dimensional stereometric measurement system using optical scanners, cylindrical lenses, and line sensors", *SPIE* , 361:67–73 (1982).

ARBITRARY-GEOMETRY LASER SURFACE SCANNER

TECHNICAL FIELD

The invention relates to a non-contact mensuration system for scanning a three-dimensional object in order to obtain data from which the shape of the object may be derived.

More particularly, although not exclusively, the present invention relates to a method and apparatus which does not require a fixed or predetermined geometrical relationship between its components per se as well as the object being scanned. Any component(s) of the scanning system and/or the object may be moved arbitrarily in space and therefore may be hand-held. Such a system is particularly suitable for obtaining measurements of irregular objects such as a human body or the like.

BACKGROUND TO THE INVENTION

Conventional laser surface scanners generally incorporate a rigid laser/camera assembly. This assembly is usually fixed in space and the object being scanned is rotated or translated on a mechanical platform. Alternatively, the object is fixed and the laser/camera assembly is moved mechanically around or along it. Usually the movement takes the form of a rotation about one axis (contained within the object) or translation in one direction (along the object). In either case, the conventional scanning process relies upon a predetermined knowledge of the geometrical relationships between the components of the scanning apparatus.

Examples of such fixed-axis laser scanners include WO 94/15173, U.S. Pat. No. 4,705,401, GB 2,240,623 A and U.S. Pat. No. 5,193,120.

Unless the object being scanned is a simple surface where every point on its surface is able to be 'seen' by the scanning apparatus in the course of a complete scan, a fixed-axis scanner is unable to measure the complete surface of an object in one scan orientation. This represents a significant limitation when scanning complex objects (for example, an entire human head). Features such as overhangs and indentations are unlikely to be visible in situations where a scanning device follows a fixed predetermined path.

Further, a fixed scan pattern or geometry cannot take into account variations in object detail or areas on the object's surface which might be obscured by intervening features protruding from the surface of the object.

Schulz (WO 92/07233) provides, to some extent, for limited freedom of movement of a laser/camera assembly by tracking the position and orientation of a plurality of light sources fixed to the scanning assembly. The location of the light sources (and therefore the scanning assembly) in three-dimensional space is determined by means of fixed photoelectronic sensors arranged in a predetermined static relationship to the fixed object. The light sources are time multiplexed with the sensors and the spatial location is derived from the three locations of the light sources. Therefore all three light sources (fixed to the scanning assembly) must be visible to all fixed photoelectronic sensors. There will generally be situations where at least one light source is obscured by the object itself, the operator or by tilting the assembly. Thus the Schulz scanner would appear to offer advantages over a fixed geometry scanner in only certain applications.

A further significant limitation inherent in the Schulz scanning system is that the object must remain stationary with respect to the reference frame defined by the photoelectronic sensors during the scan. This can present difficulties, particularly in medical applications, due to the potential for movement of the part of the subject being scanned. Accordingly, it would be desirable to be able to scan an object which may be arbitrarily located and oriented in space where such arbitrariness is understood to include an object which may be moving, or to at least provide the public with a useful choice.

The present invention attempts to overcome the limitations and disadvantages inherent in the prior art by providing a means and method of scanning an arbitrarily located and oriented object with the scanner components being arbitrarily located and oriented in space.

The present invention also provides a scanning system which may operate in ambient light and has reduced susceptibility to optical interference in the process of imaging the scanned portion of the object.

The present invention also provides for a non-optical technique for determining the spatial locations and orientations of the components of the scanning system and object.

DISCLOSURE OF THE INVENTION

In one aspect the invention provides an optical surface scanner including:

an illumination means adapted to emit a fan beam of light whereby the intersection between the fan beam and an object being scanned produces a profile having three-dimensional coordinates which lie in the plane of the fan beam;

a camera which images the profile in two dimensions;

a spatial location system adapted to obtain the relative positions and orientations between the object, illumination means and camera, wherein the three-dimensional coordinates of the profile are derived from the two-dimensional coordinates of the image and the relative positions and orientations of the illumination means, camera and object.

In a further aspect the invention provides for an optical surface scanner including:

an illumination means adapted to emit a pencil beam of light whereby the intersection between the pencil beam and an object being scanned produces a spot having three-dimensional coordinates which lie on the axis of the pencil beam;

a camera which images the spot in one or two dimensions;

a spatial location system adapted to obtain the relative positions and orientations between the object, illumination means and camera, wherein the three-dimensional coordinates of the spot are derived from the one or two-dimensional coordinates of the image and the relative positions and orientations of the illumination means, camera and object.

In a further aspect the optical surface scanner includes:

one or more illumination means each adapted to emit a fan beam or a pencil beam of light whereby the intersection between each fan beam or pencil beam of light and the object being scanned produces a profile or spot having three-dimensional coordinates which lie in the plane of the fan beam producing that profile or lie on the axis of the pencil producing that spot;

a plurality of cameras which image the profiles or spots;

means for distinguishing between the sources of illumination, a spatial location system adapted to obtain the relative positions and orientations between the object, illumination means and cameras;

wherein the three-dimensional coordinates of each profile or spot are derived from the two-dimensional or one/two dimensional coordinates respectively of the corresponding image and the relative positions and orientations of the cameras, illumination means and object.

Preferably the means for distinguishing between the sources of illumination uses time division multiplexing of the sources of illumination or different wavelength sources.

Preferably the camera and illumination means are held in fixed relation.

Preferably the illumination means and camera(s) are mounted in a fixed relationship on a hand-held assembly.

Preferably the hand-held assembly includes two cameras and one illumination means wherein the illumination means is positioned between the cameras and the cameras and illumination means are oriented so that the cameras image a profile or spot produced by the intersection of the fan beam or pencil beam respectively and the object being scanned.

Preferably the location and orientation of the hand-held assembly is determined by means of the spatial location system.

Preferably the spatial location system is adapted so as not to depend on maintaining line of sight between its constituent components.

Preferably the spatial location system comprises a plurality of transmitters and a plurality of receivers.

Preferably the spatial location system uses electromagnetic fields.

Preferably the illumination means is a laser.

Preferably the fan beam is produced by means of a cylindrical lens or similar means.

Preferably the optical surface scanner includes at least one optical band-pass filter per camera.

Preferably the band-pass filter comprises interference filters adapted to balance the contrast of the profile as imaged by the camera.

Preferably the one or more optical band-pass filters are located immediately in front of the camera.

The present invention further provides for a mensuration method for three-dimensional objects comprising:
- imaging the intersection of a fan beam or pencil beam of light and an object being scanned;
- measuring the relative orientations and locations of a camera, illumination means and object;
- calculating three-dimensional coordinates of the intersection of the fan beam or pencil beam of light and the object being scanned;
- repeating the above steps for a variety of orientations and/or locations of camera and/or illumination means and/or object.

Preferably the relative position and orientation of the object, illumination means and camera are obtained by means of the spatial location system for each recorded image of the intersection of the fan beam or pencil beam and the object.

Further objects and advantages of the invention will become apparent from the following description which is given by way of example and with reference to the drawings in which:

BRIEF DESCRIPTION OF THE DRAWINGS

Referring to FIG. 1, 100 is the object to be scanned. The major components of the scanning system are as follows. An illumination assembly 110 incorporates a low-power laser 101 which is directed through a cylindrical lens 102 thereby generating a fan beam. Other methods of producing a fan beam are envisged. For example, a point source with a slit aperture and collimator may produce the desired fan beam. An imaging assembly 109 incorporates a two-dimensional (area array) electronic camera 103 which has an optical band-pass interference filter 104 covering its lens.

Figure 1:
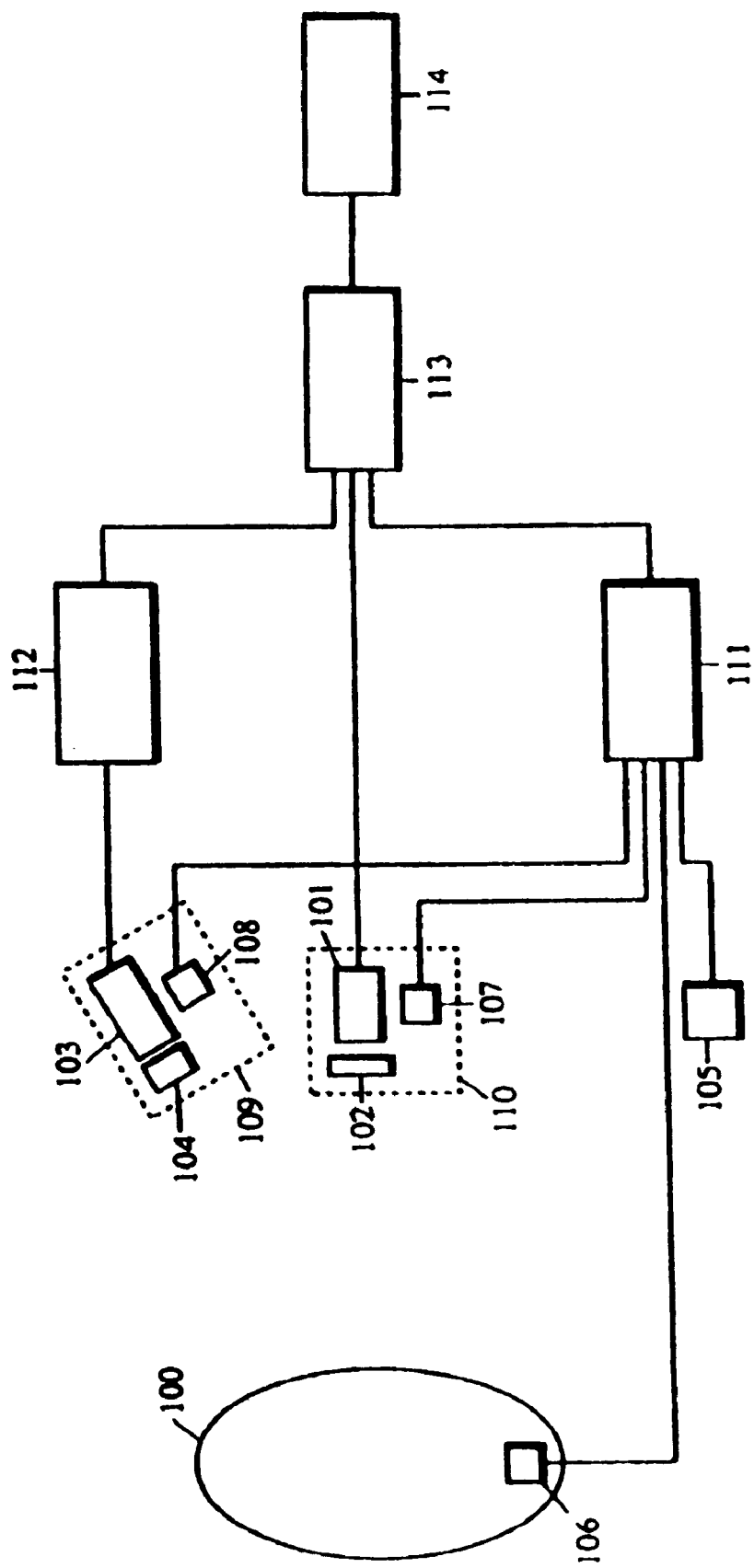
FIG. 1: illustrates a schematic diagram of an embodiment of an optical surface scanner incorporating one illumination means and one camera.

The spatial location system comprises a spatial location transmitter 105 and spatial location receivers 106, 107 and 108.

Spatial location electronics unit 111 and laser line extraction electronics 112 are interfaced to controlling electronics and power supply 113. 114 corresponds to a digital computer.

It is considered that an innovative feature enabling the construction of the truly arbitrary-geometry scanner described herein, resides in the use of spatial location devices 105, 106, 107 and 108 to obtain the relative position and orientation (6 degrees of freedom) of the object 100, laser(s) 101 and camera(s) 103. The spatial location system may correspond to an electronic device such as a Polhemus 'Fastrak' based on alternating electric fields or an Ascension 'Bird' based on pulsed static electric fields.

Referring to FIG. 1, the dashed boxes 109 and 110 indicate the components which are combined into the portable hand-held assemblies each associated with a spatial location receiver 107 and 108. In this case the imaging assembly 109 consists of imaging components (camera 103 and filter 104) and spatial location receiver 108. The illumination assembly 110 consists of illumination components (laser 101 and cylindrical lens 102) and spatial location receiver 107.

Figure 3:
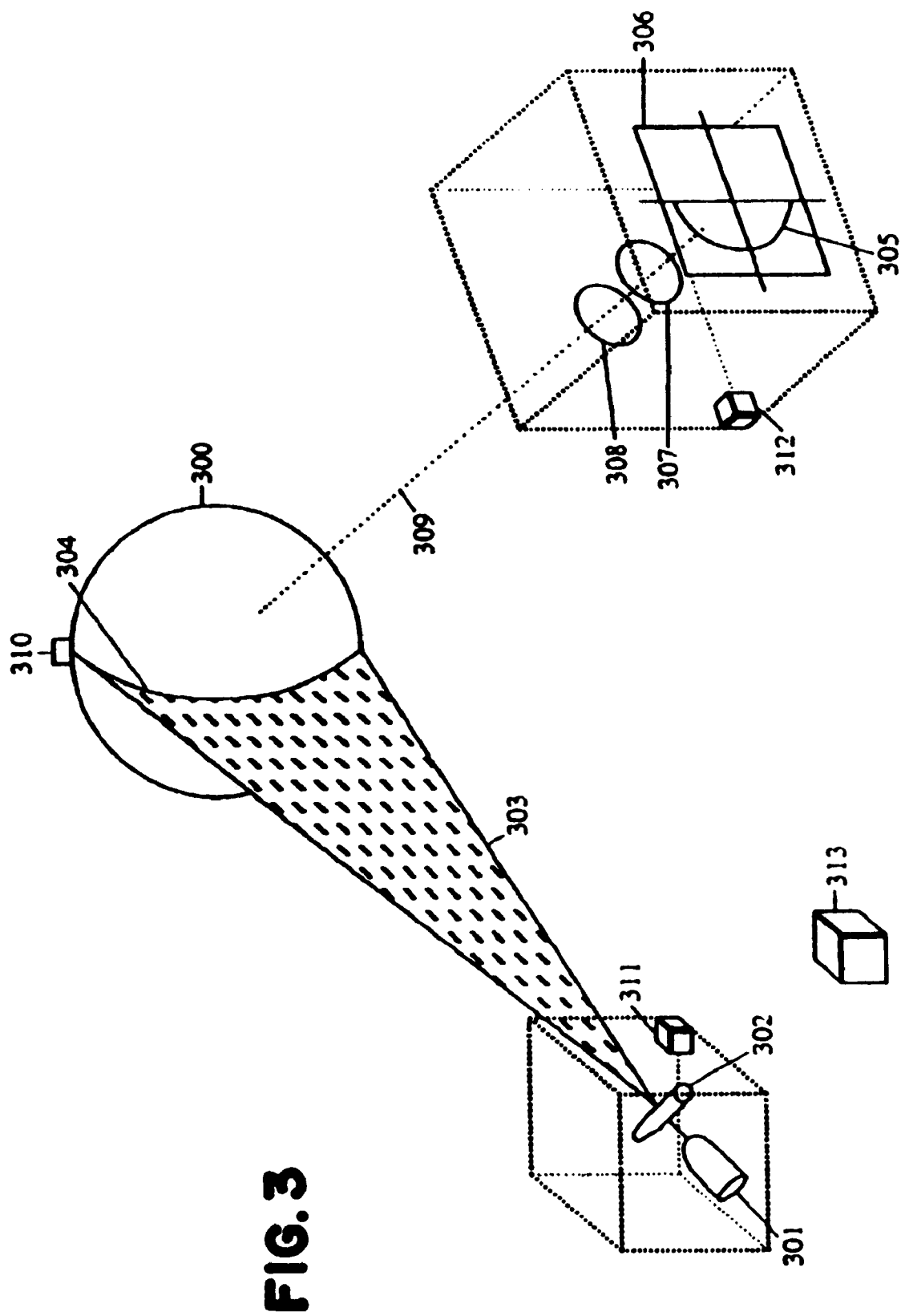
FIG. 3: illustrates a perspective view of the system in FIG. 1 when used to scan a spherical object with a fan beam.

A three-dimensional representation of the system of FIG. 1 is shown in FIG. 3. A cylindrical lens 302 spreads the beam emitted by the laser 301 into a fan beam 303 so that the intersection between the fan beam and the object being scanned 300 produces a profile 304. The camera includes a lens 307 a CCD array 306 and a filter 308 in front of the camera. The image 305 of the profile 304 is obtained by the camera when viewing the object at an offset angle. The two-dimensional coordinates of the image of the profile are recorded.

The object 300, laser 301 and camera (306 and 307) are associated with spatial location receivers 310, 311 and 312 respectively thereby allowing their orientation and location in space to be measured in real time. Thus the laser and camera may be moved arbitrarily in space so as to record desired profiles thereby building a reconstructed surface. Alternatively, the object may be moved so as to record the desired profiles.

In use, profiles 304 are recorded by directing the laser fan beam at the object while simultaneously positioning the camera so that the profile is visible to it. The utility of the present system is illustrated by situations where features of the object might obscure either the illumination or the camera's field of view when using a fixed illumination/imaging system. If such a geometry is encountered, the illumination and/or camera and/or object may be moved into an orientation or position where the profile is visible to the camera.

The spatial location system 310, 311, 312 and 313 provides the required spatial location and orientation information for the object, camera and laser whereupon the three-dimensional coordinates of the profile are determined from the two-dimensional pixel coordinates in the camera CCD array 306.

The scanner may include an interference filter 308 which allows scanning under ambient light conditions. A further purpose of the interference filter is to balance the profile contrast as seen by the camera as discussed below.

Interference filters present a lower wavelength pass-band to light from off-axis and this effect is exploited. The intensity of the profile typically diminishes with distance from its centre. Therefore, if a filter is chosen with a pass-band centered above the laser wavelength, the distal ends of the laser profile are subject to less attenuation by the filter. This balances the laser profile contrast as seen by the camera. Such an application of an interference filter is, to the applicants' knowledge, novel.

Referring to FIG. 1 the output from each two-dimensional camera 103 (such as a CCD array) is processed appropriately by line extraction electronics 112 to produce a list of pixels (two-dimensional camera coordinates) at which the intensity exceeds some threshold (constant or adaptive).

The controlling electronics unit 113 performs such tasks as synchronising the cameras, lasers and spatial location receivers, monitoring switches, supplying power, preprocessing and interfacing this data stream to the digital input/output port of the host digital computer 114. The digital computer is programmed to reconstruct the three-dimensional coordinates of the object's surface. Such a reconstruction may employ transformation methods known in the art which convert each two-dimensional point in the profile, viewed by the camera, to a three-dimensional point in the camera frame of reference and then to a three-dimensional point in the object frame of reference.

The reconstruction process must determine the coordinates of a three-dimensional point, in the object's frame of reference, corresponding to each pixel identified by the laser line extraction electronics.

This can be accomplished in a number of ways. For example, if a simple linear model of the camera is assumed, then a ray can be traced from the pixel location through the centre of the lens whereby the intersection of the ray with the plane of the laser will determine the three-dimensional coordinate of the illuminated spot on the object, the camera coordinates and the laser plane having been transformed into the object's coordinate system using the spatial location information.

Alternatively, a 'look-up table' can be used to transform from pixel coordinates to three-dimensional coordinates in the camera frame of reference, and then these coordinates can be transformed into the objects coordinate system using the spatial location information.

The look-up table can be produced by an empirical calibration process. Therefore allowances may be made for non-linear effects such as lens distortion as well as providing for a faster means of data conversion in the computer.

It will be appreciated that the location of the object being scanned is constantly determined by means of the spatial location system. Therefore, so long as the receiver associated with the object remains in fixed relation to the object, the object is free to move during the scanning process.

It is to be appreciated that both the number of cameras and lasers and/or the geometry of the system can be varied if desired. If, for example, any two or more components retain a fixed relative spatial relationship throughout the scan, then the position and orientation of the combined assembly may be recorded by a single spatial location receiver (the relative locations and orientations of the assembly components being fixed and determined beforehand).

Figure 2:
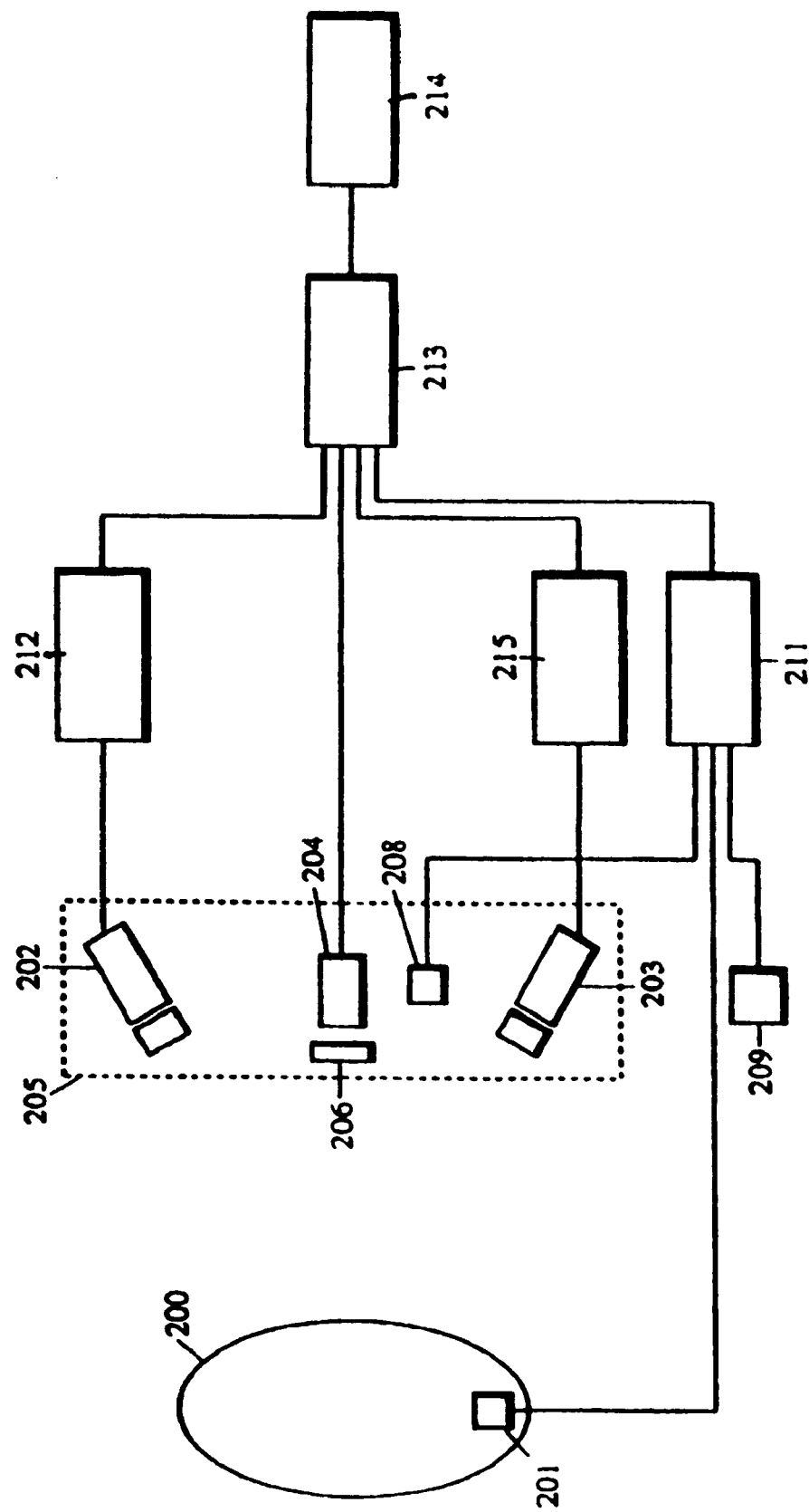
FIG. 2: illustrates a schematic diagram of an embodiment of an optical surface scanner incorporating a single illumination means and two cameras embodied in a single scanning head.

FIG. 2 illustrates an embodiment in which the cameras 202 and 203 and laser 204 are mounted on a hand-held assembly 205 (dotted). In this configuration the geometrical relationship between the laser fan beam and the cameras are fixed and known. Accordingly, savings in image processing speed can be effected.

The system shown in FIG. 2 is, in most respects, the same as that in FIG. 1 except that additional line extraction electronics 215 are required and a single spatial location receiver 208 is required for the hand-held assembly 205.

The embodiment shown in FIG. 2 is also advantageous in that the scanning assembly is contained in a convenient 'package' or 'wand'. However, the present invention is not restricted to such a construction, and there may be applications where one or more arbitrarily located cameras and/or lasers are required.

In the applicants' prototype (which corresponds to the example shown in FIG. 2) a single laser 204 and cylindrical lens 206 is positioned between two cameras 203 and 202, the laser and cameras being fixed in relation to each other and mounted on a portable hand-held assembly indicated by the dashed box 205. The location and orientation of 205 is determined by the spatial location receiver 208. The location of the object 200 is determined by a second spatial location receiver 201 with the transmitter 209 fixed in space throughout the scan. Each camera is separated from the laser by about 250 mm and the optical axis of each camera is angled to cross the plane of the fan beam at an enclosed angle of about 30 degrees.

In operation, the hand-held unit 205 is directed so that the fan beam intersects the object 200. Each camera 203 and 202 images the profile at a known and fixed offset angle. The profiles are sampled at a rate sufficient so that if the hand held unit is moved at right angles to the plane of the beam (ie; the laser fan beam is swept across the object) the scanned area can be considered as a series of profiles, each of which is imaged and reconstructed thus forming the scanned surface.

Alternatively, the spatial location transmitter could be attached directly to the object in place of a separate receiver.

In an alternative embodiment, the object is held in fixed relation to the transmitter throughout the course of the scanning process. Similarly, any one component of the scanning system itself (camera or laser) may be held stationary throughout the scan. Its position and orientation is thus an arbitrary constant and need not be recorded by the spatial location system.

Where in the foregoing description reference has been made to elements or integers having known equivalents, then such equivalents are included as if they were individually set forth.

Although the present invention has been described by way of example and reference to particular embodiments, it is to be understood that modifications and improvements may be made without departing from the scope of the invention as set out in the appended claims.

We claim:

1. An optical surface scanner including:
   an illumination means adapted to emit a fan beam of light whereby the intersection between the fan beam and an object being scanned produces a profile having three-dimensional coordinates which lie in the plane of the fan beam;

a camera which images the profile in two dimensions;

a spatial location system which obtains the relative positions and orientations of the object, illumination means and camera, the three-dimensional coordinates of the profile derived from the two-dimensional coordinates of the image and the relative positions and orientations of the illumination means, camera and object.

2. An optical surface scanner including:

an illumination means adapted to emit a pencil beam of light whereby the intersection between the pencil beam and an object being scanned produces a spot having three-dimensional coordinates which lie on the axis of the pencil beam;

a camera which images the spot in one or two dimensions;

a spatial location system which obtains the relative positions and orientations of the object, illumination means and camera, the three-dimensional coordinates of the spot derived from the one or two-dimensional coordinates of the image and the relative positions and orientation of the illumination means, camera and object.

3. An optical surface scanner including:

one or more illumination means each emitting a fan beam of light whereby the intersection between each fan beam of light and the object being scanned produces a profile having three-dimensional coordinates which lie in the plane of the fan beam producing that profile;

a plurality of cameras which image the profiles;

means for distinguishing between illumination produced by the one or more illumination means;

a spatial location system which obtains the relative positions and orientations of the object, illumination means and cameras, the three-dimensional coordinates of each profile derived from the two-dimensional coordinates or one/two dimensional coordinates respectively of the corresponding image and the relative positions and orientations of the cameras, illumination means and object.

4. An optical surface scanner as claimed in claim 3 wherein the means for distinguishing between the sources of illumination uses time division multiplexing of the sources of illumination or different wavelength sources.

5. An optical surface scanner as claimed in either of claims 1 or 3 wherein the fan beam is produced by means of a cylindrical lens.

6. An optical surface scanner as claimed in claim 3 wherein the camera(s) and illumination means are held in fixed relation.

7. An optical surface scanner as claimed in claim 6 wherein the illumination means and camera(s) are mounted in a fixed relationship on a hand-held assembly.

8. An optical surface scanner as claimed in claim 7 wherein the hand-held assembly includes two cameras and one illumination means, wherein the illumination means is positioned between the cameras and the cameras and illumination means are oriented so that the cameras image a profile produced by the intersection of the fan beam and the object being scanned.

9. An optical surface scanner as claimed in claim 3 wherein the location and orientation of the hand-held assembly is determined by means of the spatial location system.

10. An optical surface scanner as claimed in claim 3 wherein the spatial location system is adapted so as not to depend on maintaining line of sight between its constituent components.

11. An optical surface scanner as claimed in claim 3 wherein the spatial location system comprises a plurality of transmitters and a plurality of receivers.

12. An optical surface scanner as claimed in claim 3 wherein the spatial location system uses electromagnetic fields.

13. An optical surface scanner as claimed in claim 3 wherein the illumination means is a laser.

14. An optical surface scanner as claimed in claim 3 including at least one optical band-pass filter per camera.

15. An optical surface scanner as claimed in claim 14 wherein the band-pass filter comprises interference filters which balances the contrast of the profile as imaged by the camera.

16. An optical surface scanner as claimed in claim 14 wherein the one or more optical band-pass filters are located immediately in front of the camera.

17. A mensuration method for three-dimensional objects comprising:

imaging the intersection of a fan beam of light and an object being scanned;

measuring the relative orientations and locations of a camera, illumination means and object;

calculating three-dimensional coordinates of the intersection of the fan beam or pencil beam of light and the object being scanned;

repeating the above steps for a variety of orientations and/or locations of camera and/or illumination means and/or object.

18. A mensuration method for three-dimensional objects as claimed in claim 17 wherein the relative position and orientation of the object, illumination means and camera are obtained by means of the spatial location system for each recorded image of the intersection of the fan beam and the object.

* * * * *